United States Patent
Sienicki

(10) Patent No.: US 9,826,463 B2
(45) Date of Patent: Nov. 21, 2017

(54) HASH PARTIAL MATCHING FOR DISCOVERY

(71) Applicant: QUALCOMM Incorporated, San Diego, CA (US)

(72) Inventor: James Sienicki, Lawrenceville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 14/133,412

(22) Filed: Dec. 18, 2013

(65) Prior Publication Data
US 2015/0172999 A1   Jun. 18, 2015

(51) Int. Cl.
| | |
|---|---|
| *H04W 48/14* | (2009.01) |
| *H04W 64/00* | (2009.01) |
| *H04W 4/20* | (2009.01) |
| *H04L 29/08* | (2006.01) |
| *H04L 29/06* | (2006.01) |

(52) U.S. Cl.
CPC ............ *H04W 48/14* (2013.01); *H04L 67/16* (2013.01); *H04L 67/303* (2013.01); *H04L 69/04* (2013.01); *H04W 4/206* (2013.01); *H04W 64/00* (2013.01)

(58) Field of Classification Search
CPC ..... H04W 48/18; H04W 48/14; H04W 4/206; H04W 64/00; H04L 67/16; H04L 67/303; H04L 69/04
USPC ......................................... 370/466; 455/41.2
See application file for complete search history.

(56) References Cited

U.S. PATENT DOCUMENTS

| | | | |
|---|---|---|---|
| 6,047,283 A | 4/2000 | Braun | |
| 7,904,429 B2 | 3/2011 | Villaret et al. | |
| 8,407,245 B2 | 3/2013 | Ryan et al. | |
| 8,458,796 B2 | 6/2013 | Stites et al. | |
| 2007/0141988 A1* | 6/2007 | Kuehnel | H04W 8/005 455/41.2 |
| 2009/0029691 A1* | 1/2009 | Shen | H04W 76/02 455/418 |
| 2009/0083537 A1* | 3/2009 | Larsen | H04L 63/0281 713/153 |
| 2013/0246378 A1 | 9/2013 | Hearnden et al. | |
| 2015/0063208 A1* | 3/2015 | Abraham | H04W 8/02 370/328 |

(Continued)

OTHER PUBLICATIONS

Jara et al., "Light-Weight Multicast DNS and DNS-SD (lmDNS-Sd): IPv6-Based Resource and Service Discovery for the Web of Things," 2012 Sixth International Conference on Innovative Mobile and Internet Services in Ubiquitous Computing (IMIS), Palermo, Jul. 4-6, 2012, pp. 731-738, XP32234800, Institute of Electrical and Electronics Engineers.

(Continued)

*Primary Examiner* — Melvin Marcelo
(74) *Attorney, Agent, or Firm* — Holland & Hart LLP

(57) ABSTRACT

Methods, systems, and devices are described that allow for partial matching of published services or service names, including compressed service names. The described features employ compression techniques, including hashing; and they allow for partial matching of compressed service name strings. Various embodiments are described that provide for identifying a desired service (or attributes of a desired service) and comparing one or more advertised attributes. The comparison of desired and advertised attributes may be utilized to determine, select, and or locate an advertised service.

30 Claims, 10 Drawing Sheets

(56) References Cited

U.S. PATENT DOCUMENTS

2016/0323248 A1* 11/2016 Zeira .................... H04L 67/306

OTHER PUBLICATIONS

Broder et al., "Network Applications of Bloom Filters: a Survey," Internet Mathematics, Jan. 1, 2003, pp. 485-509, vol. I, No. 4, XP002475351, A.K. Peters, Ltd., US.
ISA/EPO, International Search Report and Written Opinion of the International Searching Authority, Int'l. App. No. PCT/US2014/069048, dated Feb. 25, 2015, European Patent Office, Rijswijk, NL, 14 pgs.
Peters et al., "Time Efficient Service Discovery in Mobile P2P Architectures Using Bluetooth," 2008 19th International Workshop on Database and Expert Systems Application, DEXA '08, Turin, Sep. 1-5, 2008, pp. 347-351, XP31320672, Institute of Electrical and Electronics Engineers.
Preuss, "JESA Service Discovery Protocol Efficient Service Discovery in Ad-Hoc Networks," Networking 2002: Networking Technologies, Services, and Protocols; Performance of Computer and Communication Networks; Mobile and Wireless Communications (Gregori et al. (Eds.)), Second International IFIP-TC6 Networking Conference Proceedings, Pisa, Italy, May 2002, pp. 1196-1201, LNCS 2345, XP19054059, Springer, Berlin,DE.
IPEA/EPO, Second Written Opinion of the International Preliminary Examining Authority, Int'l. App. No. PCT/US2014/069048, dated Nov. 10, 2015, European Patent Office, Rijswijk, NL, 5 pgs.

* cited by examiner

HASH PARTIAL MATCHING FOR DISCOVERY

BACKGROUND

Wireless communication systems are widely deployed to provide various types of communication of services and content, including voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Wireless devices employing these or other technologies and operating in such systems may communicate with one another to convey information about a particular service. A device may publish information related to a particular service the device offers, for example. Other devices may receive the published information and attempt to utilize the device or the published service if the published service matches a particular sought-after service. In some instances, techniques are used to limit or reduce the size of the published information. For example, the name of a particular service may be reduced for publication purposes. But existing solutions for reducing such information may not allow for devices to perform partial matching of information. Existing solutions may not allow a device to find or utilize certain published services if the published name represents only a partial match to a desired service.

SUMMARY

The described features generally relate to one or more methods, systems, and apparatuses that may allow for a partial matching of published services or service names. Various protocols, such as those using reverse domain name system (DNS) style naming (e.g., com.mycompany.myservice.mydevice), may allow one device to publish a service that other devices can search for and find. In some cases, this process of finding a relevant and/or desired service is called matching. A "matching device"—a device searching for a service—may choose to search for a complete service name string or perform a partial match by matching only a prefix, for example, of a published service name. In such cases, the matching device may have an increased number of search results. For instance, a search may be made for a DNS style name that includes "com.mycompany.myservice," without regard to the name of a particular device advertising such a service. In that scenario, a search employing a partial match criteria may return results for all available devices offering the service.

In some embodiments, a method of wireless communication includes generating a compressed first expression including one or more compressed desired attributes, receiving a compressed second expression including one or more compressed advertised attributes, comparing the compressed desired attributes and the compressed advertised attributes, and determining if at least one of the compressed desired attributes includes at least a partial match with at least one of the compressed advertised attributes.

In some embodiments, a system for wireless communication includes means for generating a compressed first expression including one or more compressed desired attributes, means for receiving a compressed second expression including one or more compressed advertised attributes, means for comparing the compressed desired attributes and the compressed advertised attributes, and means for determining if at least one of the compressed desired attributes includes at least a partial match with at least one of the compressed advertised attributes.

In some embodiments, an apparatus for wireless communication includes a processor, a memory in electronic communication with the processor, and instructions stored in the memory. The instructions may be executable by the processor to generate a compressed first expression including one or more compressed desired attributes, receive a compressed second expression including one or more compressed advertised attributes, compare the compressed desired attributes and the compressed advertised attributes, and determine if at least one of the compressed desired attributes includes at least a partial match with at least one of the compressed advertised attributes.

In some embodiments, a computer program product for wireless communication includes a non-transitory computer readable medium, which stores instructions executable by a processor to generate a compressed first expression including one or more compressed desired attributes, receive a compressed second expression including one or more compressed advertised attributes, compare the compressed desired attributes and the compressed advertised attributes, and determine if at least one of the compressed desired attributes includes at least a partial match with at least one of the compressed advertised attributes.

In certain examples, the method, system, apparatus, and/or computer program product may also include steps for, means for, and/or instructions executable by a processor for selecting the compressed second expression when one of the compressed desired attributes includes at least a partial match with at least one of the compressed advertised attributes.

In certain examples, the method, system, apparatus, and/or computer program product may also include steps for, means for, and/or instructions executable by a processor for determining a location based at least in part on the compressed second expression.

In certain examples of the method, system, apparatus, and/or computer program product, determining the location may include determining a location of a service advertised by the compressed second expression.

In certain examples, the method, system, apparatus, and/or computer program product may also include steps for, means for, and/or instructions executable by a processor for identifying an uncompressed first expression comprising one or more uncompressed desired attributes, and compressing each of the one or more uncompressed desired attributes.

In certain examples of the method, system, apparatus, and/or computer program product, the compressed first expression may correspond to a reverse domain name system (DNS) style name string for a desired service and the compressed second expression may correspond to a reverse DNS style name string for an advertised service.

In certain examples of the method, system, apparatus, and/or computer program product, each of the compressed desired attributes and each of the compressed advertised attributes may correspond to individual elements of one or more services names, and the one or more service names may be reverse domain name system (DNS) style name strings.

In certain examples, the method, system, apparatus, and/or or computer program product may also include steps for, means for, and/or instructions executable by a processor for specifying a criteria for comparing the compressed desired attributes and the compressed advertised attributes.

In certain examples of the method, system, apparatus, and/or computer program product, at least one of the compressed first expression or the compressed second expression may include at least one wildcard attribute.

In certain examples of the method, system, apparatus, and/or computer program product, at least one of the compressed first expression or the compressed second expression may include a compression size indicator.

In certain examples of the method, system, apparatus, and/or computer program product, at least one of the compressed first expression or the compressed second expression may include a compression algorithm indicator.

In certain examples of the method, system, apparatus, and/or computer program product, at least one of the compressed first expression or the compressed second expression may include an end-of-expression indicator.

In certain examples of the method, system, apparatus, and/or computer program product, at least one of the compressed first expression or the compressed second expression may include attributes compressed with at least two compression algorithms.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, and apparatuses that may allow for partial matching of published services or service names are described. The described techniques may utilize a compression technique, such as hashing, and the partial matching techniques described herein may be referred to as hashed partial matching. For example, individual elements of a service name string may be compressed or hashed into fixed-size chunks (e.g., 8, 12, or 16 bits), and then the compressed elements may be concatenated to form a string of hashes.

In some examples, such as those utilizing reverse DNS style naming, the word or words between each dot in the string may be separately hashed. The size of the hash string may be equal to the number of words in a service name string multiplied by the size of each individual hash. For example, "com.mycompany.myservice.mydevice" may have a hash string of 4*(hash_size). This may allow partial matching of the hash string in a manner similar to matching the entire service string.

In some cases, an issue may arise if the length of a published name string exceeds the size of data that can be transmitted over a particular discovery medium (e.g., 16 bytes for LTE-Direct). Hashing the entire string, while allowing the name string to be transmitted, may not allow for partial matching. Hashing each individual element of the string, which may also be referred to as an attribute, may, however, allow for partial matching. Furthermore, the chance of a false positive match decreases as the size of the individual hashes and the number of words in the service name string increases.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
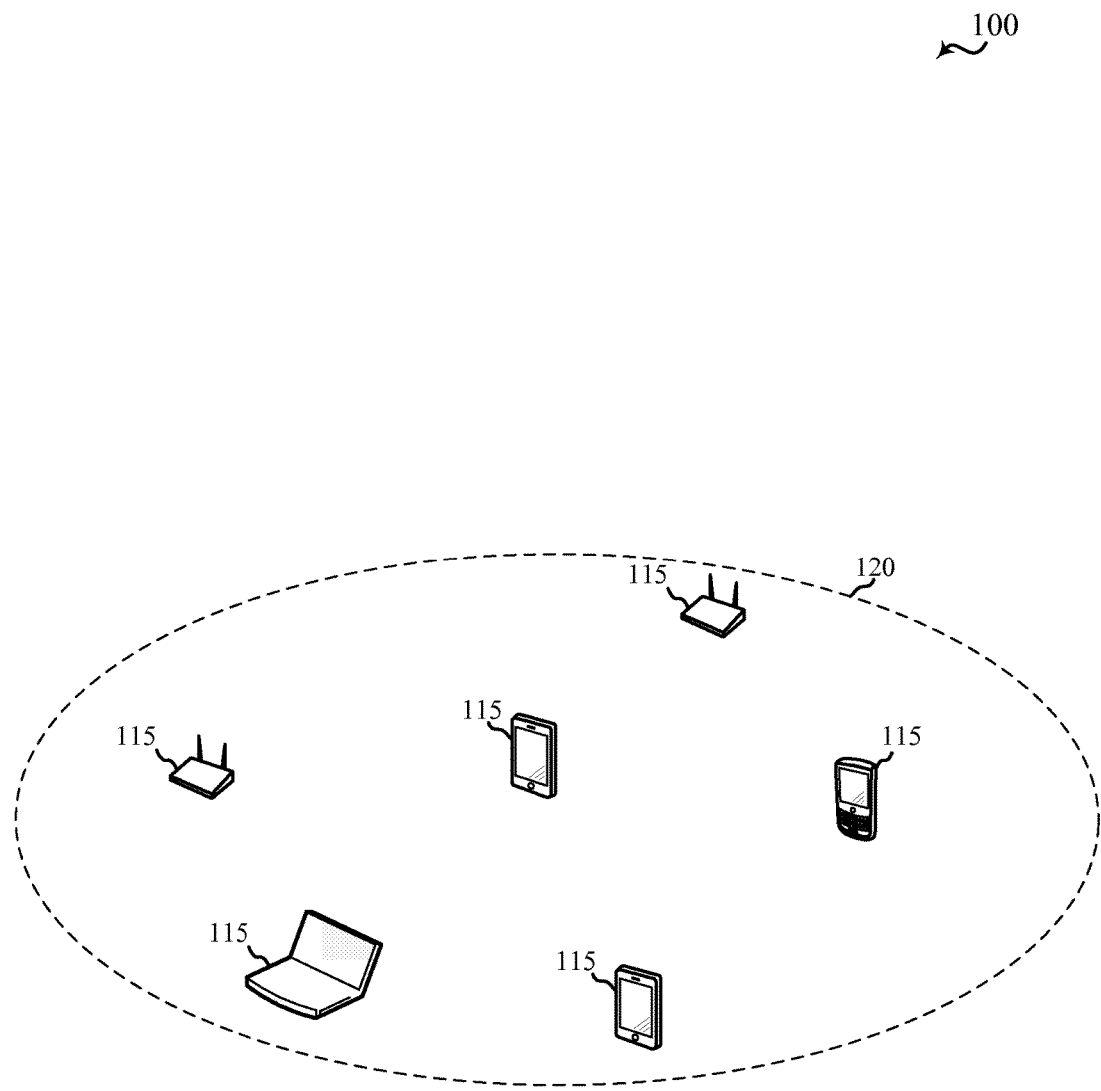
FIGS. 1A and 1B depict a wireless communications system(s), in accordance with various embodiments.

Referring first to FIG. 1A, which depicts a wireless communication system 100, in accordance with various embodiments. The system 100 includes devices 115 in an area 120. The devices 115 may be referred to as user equipment or UE 115. The devices 115 may be computers, cellular phones, smartphones, tablets, laptop computers, notebook computers, netbook computers, PDAs, smartTVs, or other similar electronic devices. In some cases, a device 115 is a WLAN or WPAN router, group owner, or access point. The devices 115 may broadcast, or otherwise transmit, signals representative of a particular service offered by each device 115. In some cases, the devices 115 broadcast a signal representative of a service available at a location near each device 115.

Figure 1B:
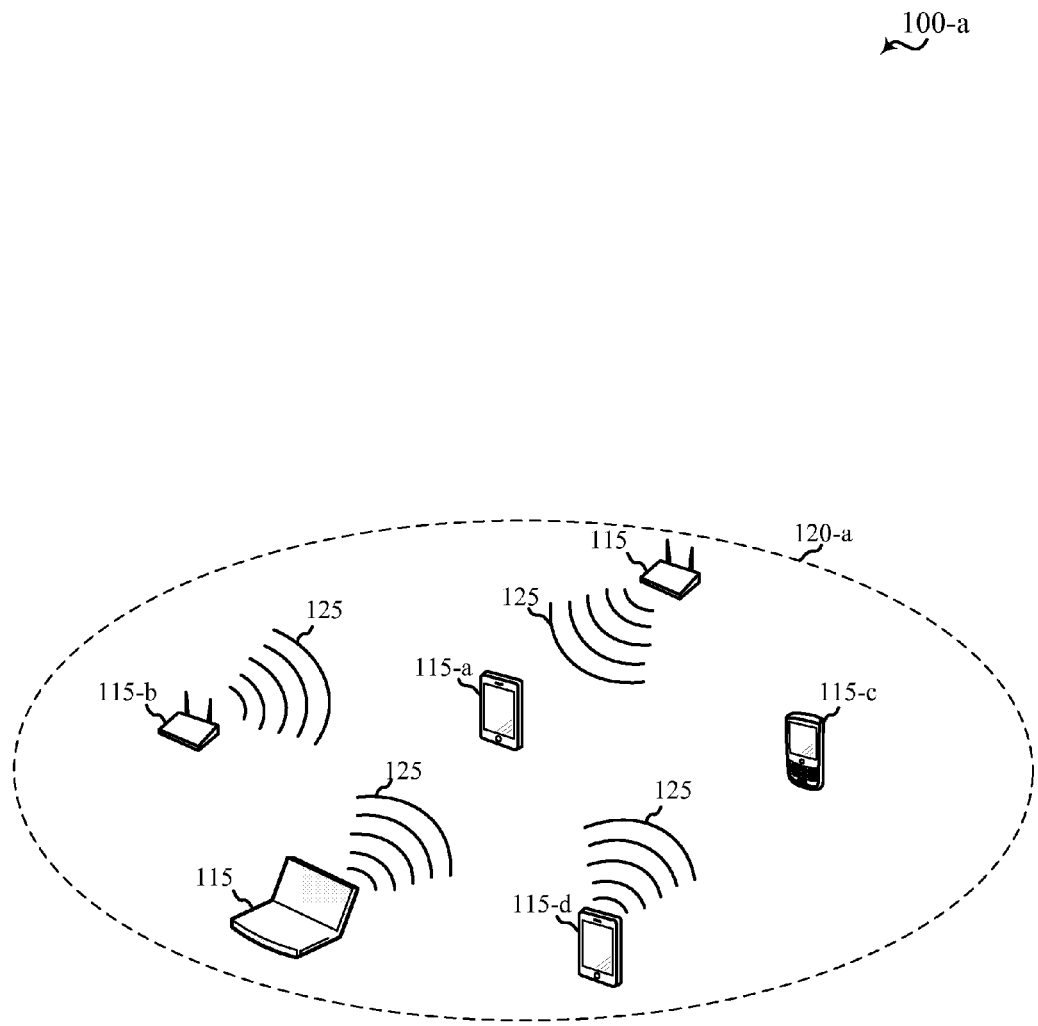

Next, FIG. 1B depicts a wireless communication system 100-a, in accordance with various embodiments. The system 100-a may be an example of the system 100. The system 100-a may include devices 115, which may be examples of the devices 115 described with reference to FIG. 1A. The devices 115 may be in an area 120-a, which may be an example of the area 120 of FIG. 1A.

A user of a device 115-*a*, for example, may search for a specific service. The device 115-*a* may be a smartphone; and the user may enter a name representative of the service into a device 115-*a* using an application of the smartphone. For example, the application may include a user interface that may prompt the user to enter details of the desired service with varying levels of specificity. In some cases, the user enters only a general description of a desired service, such as "restaurant" or "printing." In other scenarios, a user may be much more specific, entering the specific cuisine-type, price range, and rating of a desired restaurant, for instance. These various details may be referred to as attributes; and when related to a desired service, they may be called desired attributes.

The device 115-*a* may accept entry of, recognize, or otherwise identify an expression consisting of one or more desired attributes. Because the desired attributes may be expressed in word form, for example, they may be referred to as uncompressed desired attributes. For instance, "casual restaurant," "green dry cleaner," "color printer," and "high-definition display" are examples of uncompressed desired attributes. An uncompressed expression may include a number of related, uncompressed attributes. For example, an uncompressed expression may be a reverse DNS style name related to a casual Italian restaurant called Giacomo's Pizza: "restaurant.casualdining.italian.giacomospizza."

The device 115-*a* may compress each of the desired attributes—for example, with a hash algorithm. In some embodiments, a SHA-1 or MD5 hash algorithm is used. In other embodiments, multiple hash algorithms are used. Those skilled in the art will recognize that any number of hash algorithms may be employed to compress the desired attributes. The device 115-*a* may generate a compressed expression that includes one or more of the compressed desired attributes. In some embodiments, the compressed expression is a concatenated string of hashed desired attributes. The compressed expression may thus be a hashed version of a reverse DNS style name string for a desired service, and each of the compressed desired attributes may correspond to individual elements (e.g., each word between dots) of a reverse DNS style name string.

Other devices 115, such as device 115-*b*, may broadcast signals 125 representing compressed expressions that include compressed advertised attributes. These broadcast compressed expressions may be concatenated strings of hashed advertised attributes, for example. Similar to the compressed desired attributes, the compressed (e.g., hashed) advertised attributes may correspond to words in a service name; and the compressed expression of advertised attributes may be broadcast from a device that offers, or is associated with a particular service. For example, an advertised service name may be associated with a particular business and/or with a service offered by a particular device. In some embodiments, the broadcast compressed expression(s) correspond to a reverse DNS style name string for an advertised service. In such cases, the compressed advertised attributes correspond to individual elements of one or more services names.

The device 115-*a* may receive a compressed expression, which includes compressed advertised attributes. By way of example, a compressed expression broadcast from the device 115-*b* may correspond to a reverse DNS style name related to a casual Mexican restaurant called Diego's Tacos: "restaurant.casualdining.mexican.diegotacos." The broadcast compressed expression may be a hashed version of the reverse DNS style name. Upon receiving the broadcast compressed expression, the device 115-*a* may compare the compressed desired attributes and the compressed advertised attributes. This may include comparing each of the attributes according to their representative level of specificity. For example, if the generated compressed expression corresponds to "restaurant.casualdining.italian.giacomospizza" and the broadcast compressed expression corresponds to "restaurant.casualdining.mexican.diegotacos," the least specific attributes of each expression correspond to "restaurant," and the most specific attributes correspond to "giacomospizza," and "diegotacos," respectively.

The device 115-*a* may then determine if there is a match between the compressed desired attributes and the compressed advertised attributes. In this example, the device 115-*a* may be referred to as the matching device. Whether a match exists may be a function of a specified criteria for comparing the attributes. The user interface of the device 115-*a* may allow a user to specify one or more criteria for comparing compressed desired and compressed advertised attributes. Or, a device 115-*a* may automatically specify such criteria.

In some embodiments, a partial matching criteria may be specified. For example, a user may indicate that she wishes to find a casual restaurant. The device 115-*a* may, for example, generate a compressed expression with compressed desired attributes that correspond to "restaurant.casualdining" The device 115-*a* may receive a compressed expression with compressed advertised attributes that correspond to "restaurant.casualdining.mexican.diegotacos." In such an example, the device 115-*a* may recognize a partial match because the received compressed expression is advertising a casual restaurant—namely, a casual Mexican restaurant called Diego's Tacos. The device 115-*a* may, based on determining a partial match between the generated and the received expression, select the received expression—e.g., in order determine additional information about the advertised service.

Unlike comparing a received compressed expression to, for example, a table or database, comparing the received expression to a generated expression allows for greater user-specificity. In other words, a generated expression may represent any desired attributes of a user, limited only by a particular application. A look-up table or database, however, may offer less flexibility.

In some cases, the device 115-*a* may use the received expression to determine a location, which may be the location of the service advertised by the received compressed expression. For example, the received compressed expression may include an attribute that corresponds to a physical location. Or, after selecting the received expression, the device 115-*a* may solicit additional information (e.g., coordinates or position information) from a device 115 associated with the advertised service.

In some embodiments, a compressed expression includes one or more wildcard attributes. For example, a user of the device 115-*c* may seek a large-format, color printing service. The desired service may be either a function offered by a particular device or a business service—e.g., the user may be in an office environment and looking for a printer, or she may be in a business park looking for a commercial printing business. In either scenario, the user may have no particular preference regarding printing technology and/or wait time, for example. The device 115-*c* may generate a compressed expression with one or more compressed desired attributes, which each may be hashed individual elements of the reverse DNS style name string "printing.largeformat.*.color." In this example, the "*" represents a wildcard value, which may correspond to an attribute used to specify printing technology (e.g., inkjet or laserjet). The wildcard value may thus allow for more possible matches.

The device 115-c may receive from the device 115-d (e.g., via the broadcast signal 125) a compressed expression with one or more compressed advertised attributes. The compressed expression may represent the reverse DNS style name string "prinint.largeformatlasejet.color.whileyouwait.jimsprintshop," which may be advertised attributes for while-you-wait, large-format, color, laserjet printing at a business called Jim's Print Shop. The device 115-c may compare the generated expression and the received expression and determine that a partial match (or a complete match) exists. Because the generated expression, in the example, employed a wildcard value for printer technology, the device 115-c may determine a complete match exists. Because the user specified a wildcard value instead of a desired print technology, any print technology (e.g., laserjet) may constitute a match.

In various embodiments, compressed expressions may include additional elements and/or compressed attributes to be used by a matching device 115. For example, a compressed expression may include a compression size indicator. The compression size indicator may be a compressed attribute or some other element that alerts a matching device 115 to a number of bits used in one or more compressed attributes, or the expression as a whole. In some cases, a compressed expression includes—e.g., is encoded with—a compression algorithm indicator. The compression algorithm indicator may be one or more bits that indicates to a matching device 115 the type(s) of algorithms used in compressing attributes of the expression and/or in creating (e.g., concatenating) the expression. Additionally or alternatively, a compressed expression may include an end-of-expression indicator, which may notify a matching device 115 where the end of an expression is, such that the matching device 115 can recognize that it has received a complete expression. The end-of-expression indicator may be, for example, one or more bits the receiving device 115 recognizes as an indication that a complete expression has been received.

Figure 2:
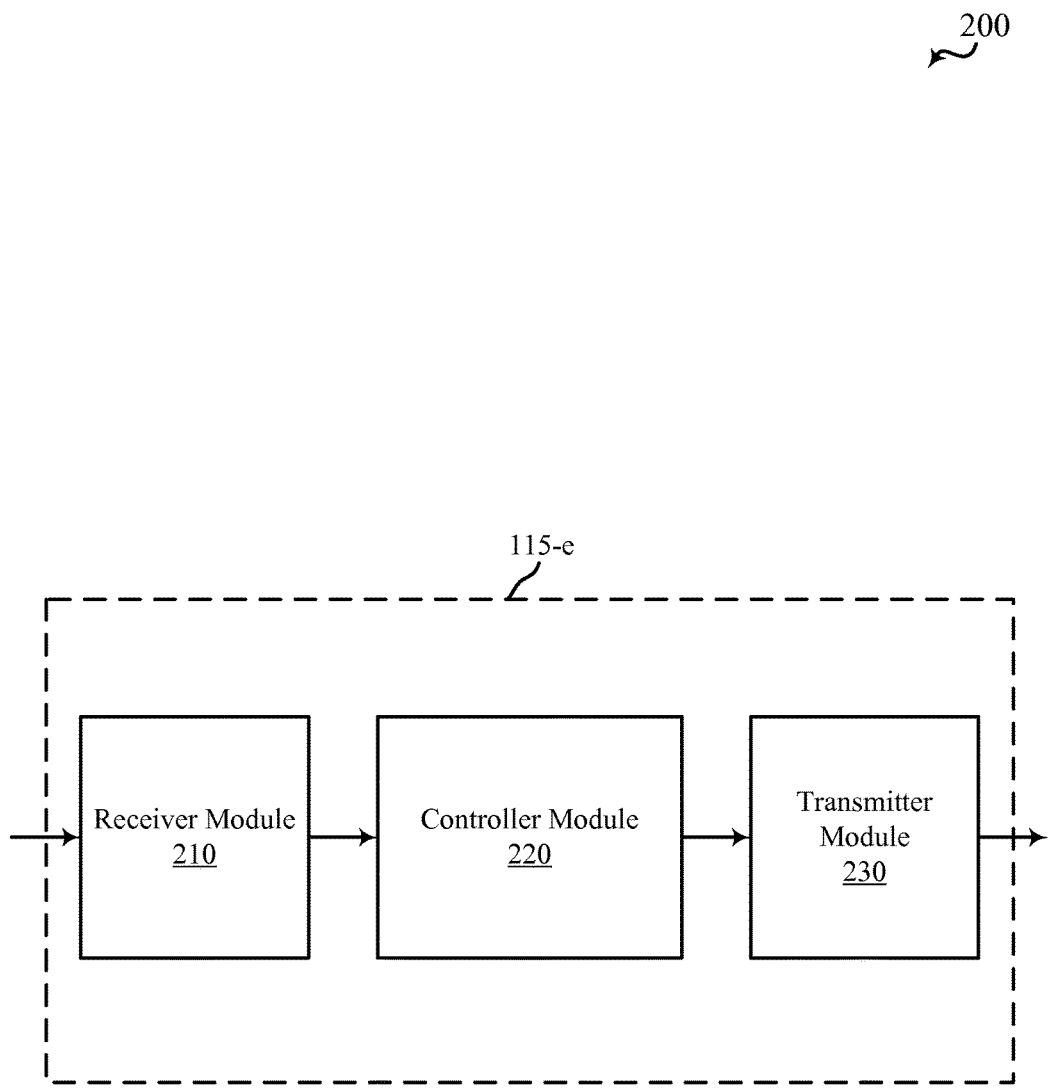
FIG. 2 depicts a block diagram of a device configured to operate in a wireless communication system according to various embodiments.

Next, FIG. 2 depicts a block diagram 200 of device 115-e configured to operate in a wireless communication system according to various embodiments. The device 115-e may be an example of, or include aspects of, one or more of the devices 115 described with reference to FIGS. 1A and/or 1B. The device 115-e may, for instance, be means for performing the functions described with reference to the devices 115. The device 115-e may include a receiver module 210, a controller module 220, and/or a transmitter module 230. Each of the modules may be in communication with one another. In some embodiments, one or more of the modules is a processor.

The controller module 220 may be configured to identify an uncompressed expression composed of one or more uncompressed desired attributes. The controller module 220 may be configured to compress the desired attributes and generate a compressed expression with the compressed desired attributes. The controller module 220 may also compare the generated expression with another compressed expression, which may be received by the receiver module 210. For example, the controller module 220 may compare the generated expression with a received expression composed of one or more compressed advertised attributes, which may correspond to a service advertised by a different device 115.

In some embodiments, the controller module 220 is also configured to determine if the generated and received compressed expressions include matching attributes. For example, the controller module 220 may determine whether one or more of the compressed advertised attributes matches, wholly or partially, one or more of the compressed desired attributes.

In some embodiments, the transmitter module 230 is configured to transmit a generated expression. For example, if the device 115-e is configured to advertise a service, the transmitter module 230 may transmit (e.g., broadcast) a signal representative of a compressed expression that corresponds to the advertised service.

The components of the device 115-e may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 3:
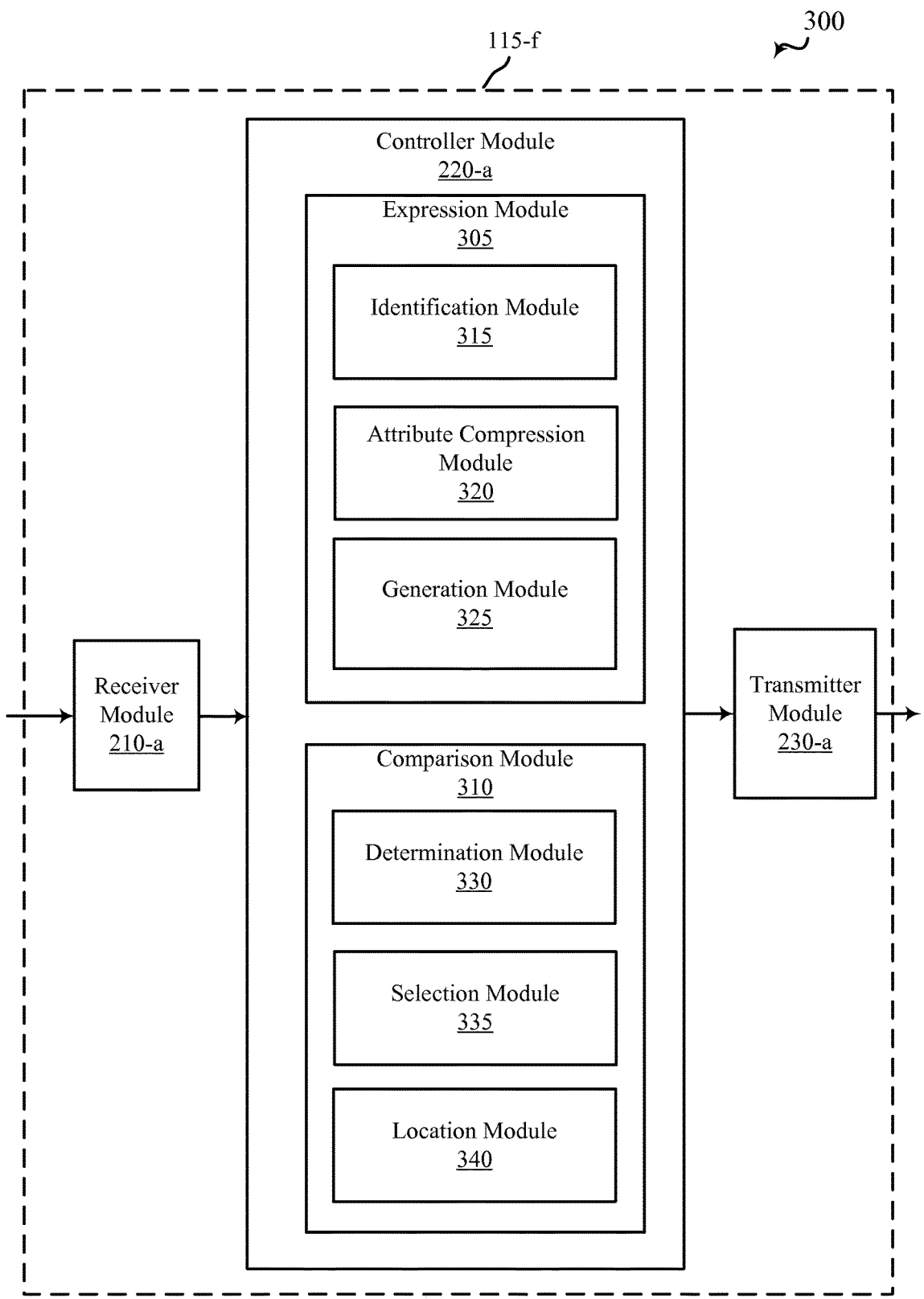
FIG. 3 depicts a block diagram of device configured to operate in a wireless communication system according to various embodiments.

FIG. 3 depicts a block diagram 300 of device 115-f configured to operate in a wireless communication system according to various embodiments. The device 115-f may be an example of, or include aspects of, one or more of the devices 115 described with reference to FIGS. 1A, 1B, and/or 2. The device 115-f may include means for performing the functions described with reference to the devices 115. For example, the device 115-f may include a receiver module 210-a, a controller module 220-a, and/or a transmitter module 230-a, each of which may be examples of, or perform similar functions as, the corresponding devices described with reference to FIG. 2.

The controller module 220-a may include an expression module 305 and/or a comparison module 310. In some embodiments, the expression module 305 includes an identification module 315, an attribute compression module 320, and/or a generation module 325. The identification module 315 may be configured to identify an uncompressed expression—e.g., a reverse DNS style name string composed of uncompressed desired attributes. The attribute compression module 320 may be configured to compress the desired attribute using, for example, one or more hash algorithms. The generation module 325 may be configured to generate a compressed expression composed of compressed desired attributes. In some cases, the generation module 325 concatenates the compressed desired attributes to form a string of hashes. Additionally or alternatively, the generation module 325 generates a compressed expression with one or more of: a wildcard attribute, a compression size indicator, or an end-of-expression indicator.

In some embodiments, the comparison module 310 includes a determination module 330, a selection module 335, and/or a location module 340. The determination module 330 may be configured to compare a received compressed expression—e.g., a compressed expression received by the receiver module 210-a—with a compressed expression generated by the generation module 325. In some embodiments, the determination module 330 is configured to specify criteria for, or to recognize user-specified criteria for, comparing generated and received compressed expressions. The determination module 330 may be further configured to determine whether attributes of the received compressed expression match, wholly or partially, the generated compressed expression. In some cases, the selection module 335 is configured to select a received compressed expression when it is determined a match (e.g., a partial match) exists. Additionally or alternatively, the location module 340 may be configured to determine a location of an advertised service, or a location of a device advertising a service, based on the received compressed expression.

Each of the modules of the device 115-*f* may be in communication with one another. In some embodiments, one or more of the modules of device 115-*f* is a processor. Furthermore, the various components of the device 115-*e* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 4:
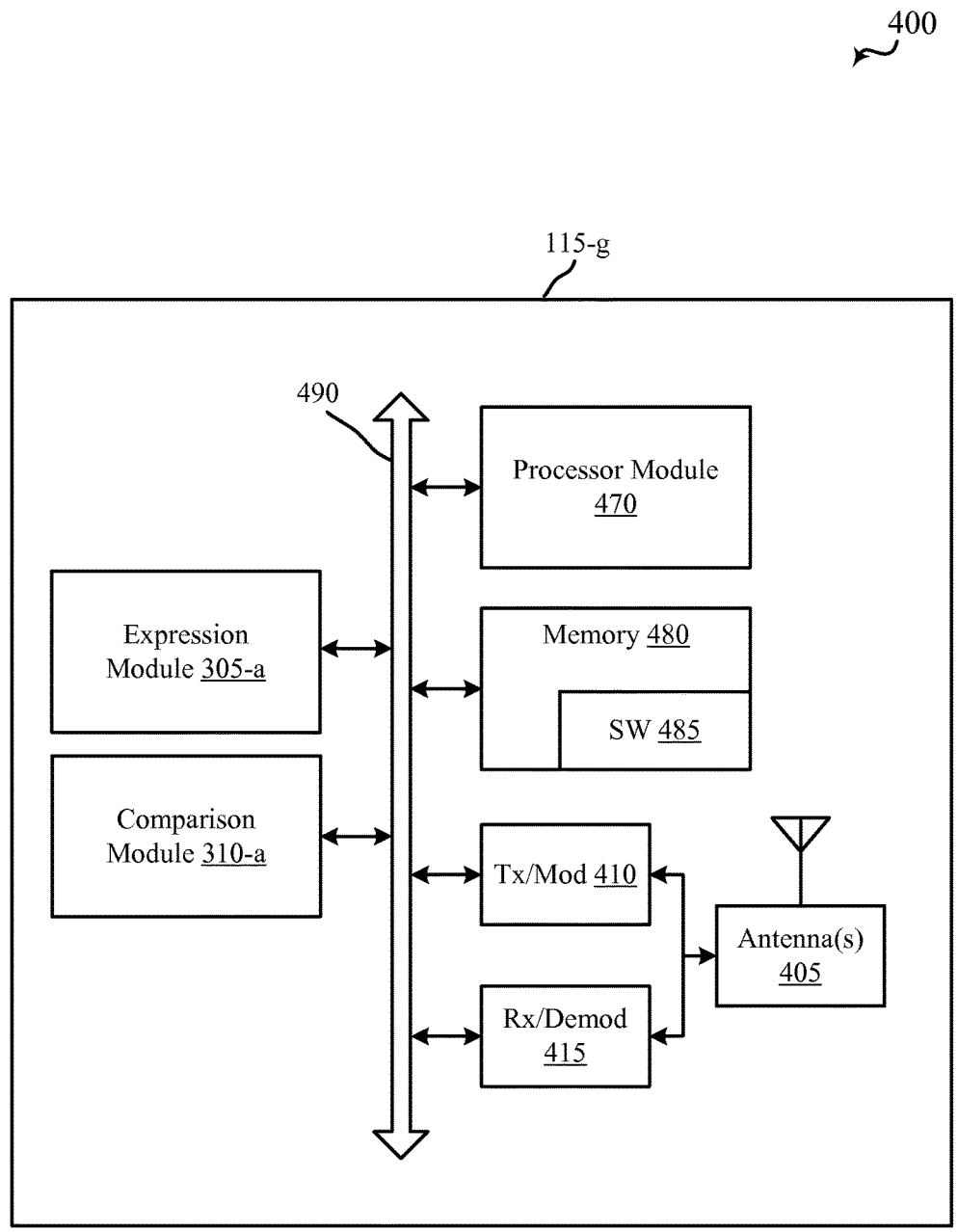
FIG. 4 depicts a block diagram of a device configured to operate in a wireless communication network according to various embodiments.

Next, referring to FIG. 4, a block diagram 400 of a device 115-*g* configured to operate in a wireless communication network according to various embodiments is shown. The device 115-*g* may have various configurations and/or be an aspect of a larger devices, such as personal computers (e.g., laptop computers, netbook computers, tablet computers, etc.), cellular telephones, PDAs, smartphones, digital video recorders (DVRs), internet appliances, gaming consoles, e-readers, printers, scanners, copiers, automated teller machines (ATMs), automated information kiosks, and the like. The device 115-*g* may have an internal power supply (not shown), such as a small battery, to facilitate mobile operation. In some embodiments, the mobile device 115-*g* may be an example of, or include aspects of, the devices 115 described with reference to FIGS. 1A, 1B, 2, and/or 3.

The mobile device 115-*g* may generally include components for bi-directional voice and data communications including components for transmitting communications and components for receiving communications. The mobile device 115-*g* may include antenna(s) 405, a transmitter (e.g., modulator) module 410, a receiver (e.g., demodulator) module 415, a processor module 470, and memory 480 (including software (SW) 485), which each may communicate, directly or indirectly, with one another (e.g., via one or more buses 490). The transmitter module 410 and the receiver module 415 may be embodied in a transceiver module, and may be configured to communicate bi-directionally, via the antenna(s) 405 and/or via one or more wired or wireless links, with one or more separate devices, as described above. The transmitter module 410 and the receiver module 415 may be or include a modem configured to modulate packets and provide the modulated packets to the antenna(s) 405 for transmission, and to demodulate packets received from the antenna(s) 405. While the device 115-*g* may include a single antenna 405, the mobile device 115-*g* may have multiple antennas 405 capable of concurrently transmitting and/or receiving multiple wireless transmissions. The transmitter module 410 and the receiver module 415 may also be capable of concurrently communicating with multiple devices 115.

The memory 480 may include random access memory (RAM) and read-only memory (ROM). The memory 480 may store computer-readable, computer-executable software/firmware code 485 containing instructions that are configured to, when executed, cause the processor module 470 to perform various functions described herein (e.g., evaluate signal measurements, determine whether a difference measurement exceeds a threshold, activate or adjust an override threshold, etc.). Alternatively, the software/firmware code 485 may not be directly executable by the processor module 470 but may be configured to cause a computer (e.g., when compiled and executed) to perform functions described herein. The processor module 470 may include an intelligent hardware device, e.g., a central processing unit (CPU), a microcontroller, an application-specific integrated circuit (ASIC), etc.

According to the architecture of FIG. 4, the device 115-*g* may further include an expression module 305-*a* and/or a comparison module 310-*a*, which may be substantially the same as the corresponding module(s) of devices 115 of FIGS. 2 and/or 3. In some embodiments, the expression module 305-*a* is configured to perform the functions of the identification module 315, the attribute compression module 320, and/or the generation module 325 described with reference to FIG. 3. And in some cases, the comparison module 310-*a* is configured to perform the functions of one or more of the determination module 330, the selection module 335, and the location module 340.

By way of example, the expression module 305-*a* and the comparison module 310-*a* are components of the device 115-*g*, and they are in communication with the other components of the device 115-*g* (e.g., via the bus 490). Alternatively, functionality of the expression module 305-*a* and the comparison module 310-*a* may be implemented as a component of one or more of the other modules of the device 115-*g*, such as the processor module 470. In some embodiments, the functionality of the expression module 305-*a* and/or the comparison module 310-*a* is implemented as a computer program product.

Figure 5:
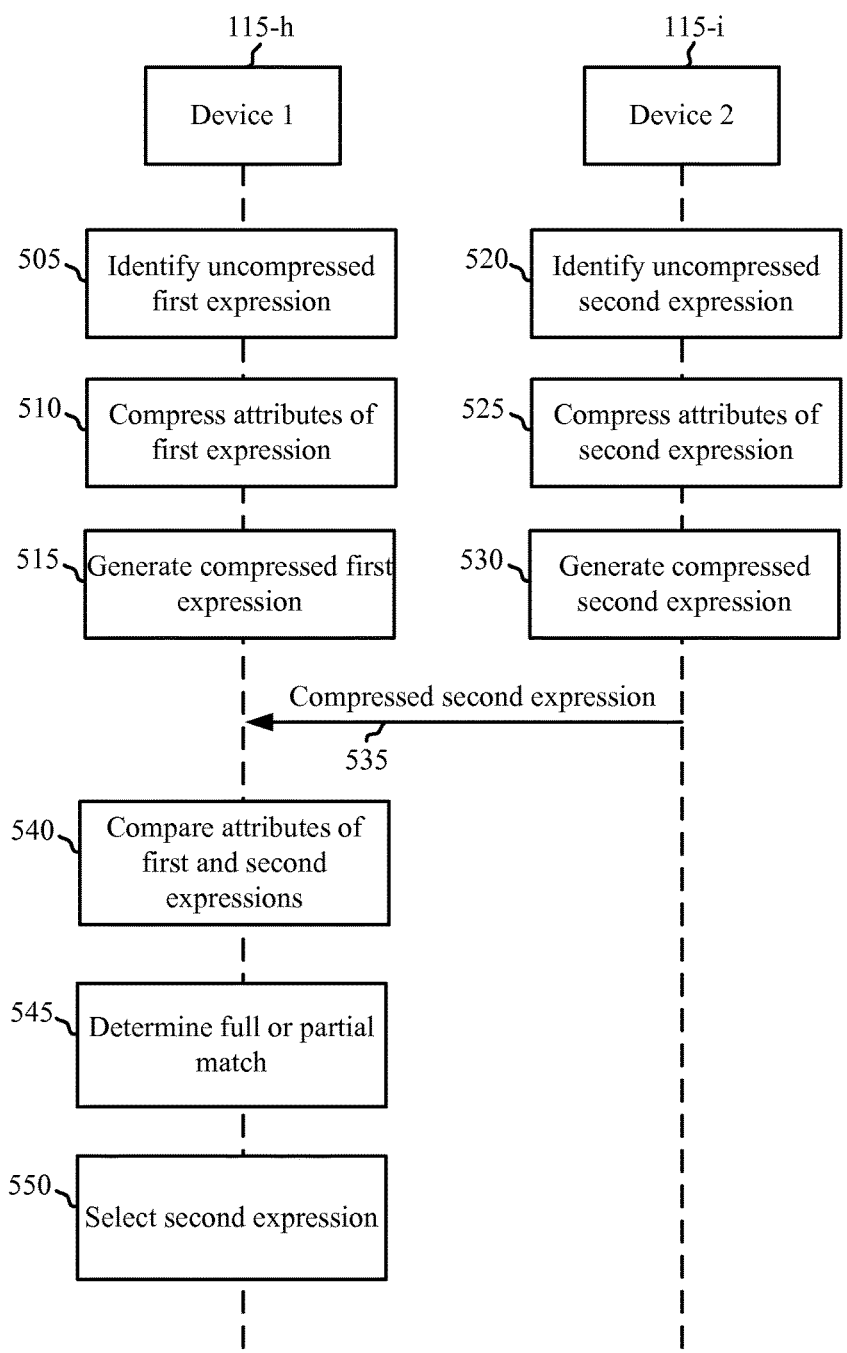
FIG. 5 depicts a call flow diagram of devices operating in a wireless communication system according to various embodiments.

Next, FIG. 5 depicts a call flow diagram 500 of devices 115 operating in a wireless communication system according to various embodiments. The devices 115 may be examples of, or include aspects of, the devices 115 described with reference to FIGS. 1A, 1B, 2, 3, and/or 4. A first device 115-*h* may identify 505 an uncompressed first expression, which may be composed of one or more uncompressed attributes. The first expression may, for example, correspond to a string of desired attributes. The first device 115-*h* may then compress 510 the attributes of the first expression and generate 515 a compressed first expression composed of those compressed attributes.

Independently and, in some cases, concurrently, a second device 115-*i* may identify 520 an uncompressed second expression, which may be composed of one or more uncompressed attributes. The second expression may correspond to a string of advertised attributes. The second device 115-*i* may then compress 525 the attributes of the second expression and generate 530 a compressed second expression composed of those compressed attributes. The second device 115-*i* may broadcast the compressed second expression 535.

The first device 115-*h* may receive the compressed second expression 535. Then, the first device 115-*h* may compare 540 the attributes of the received compressed second expression with attributes of the generated compressed first expression. In some cases, based on user-specified criteria for comparison, the first device 115-*h* determines 545 whether there is a full or partial match between the attributes of the compressed first and second expressions. If the first device determines there is at least a partial match, it may select 550 the second expression.

Figure 6:
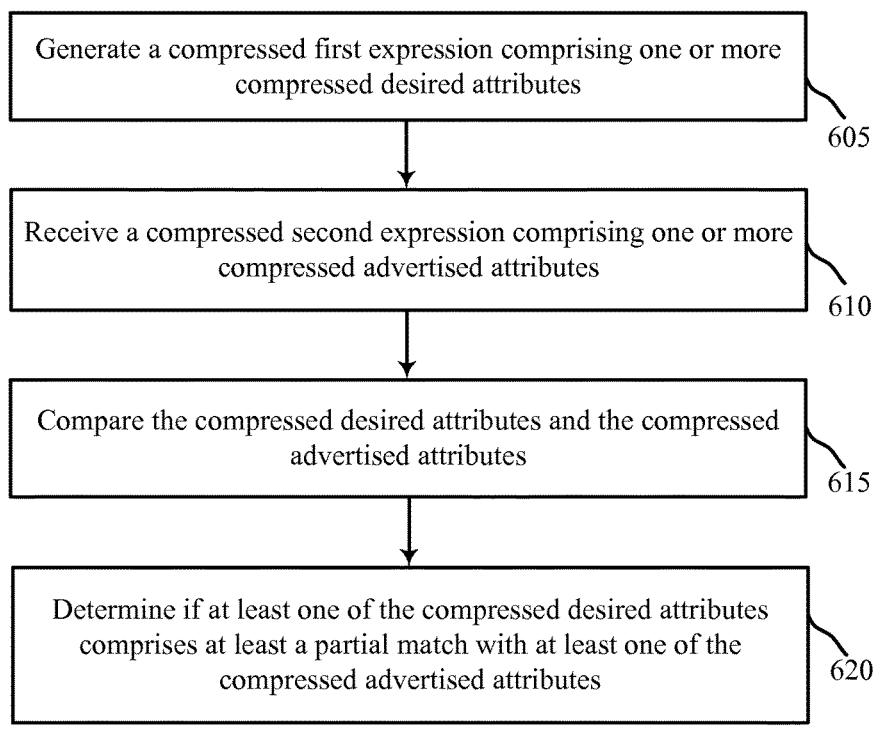
FIG. 6 depicts a flow diagram of a method of wireless communication, in accordance with various embodiments.

FIG. 6 depicts a flow diagram of a method 600 of wireless communication, in accordance with various embodiments. The method 600 may be implemented by one or more of the devices 115 of FIGS. 1A, 1B, 2, 3, 4, and/or 5.

At block 605, the method may include generating a compressed first expression that includes one or more compressed desired attributes. The operations of block 605 are, in various embodiments, performed by the controller module 220 of FIGS. 2 and/or 3, the expression module 305 of FIGS. 3 and/or 4, and the generation module 325 of FIG. 3.

In some embodiments, the compressed first expression corresponds to a reverse DNS style name string for a desired service. Additionally or alternatively, each of the compressed desired attributes may correspond to individual elements of one or more service names. The compressed first expression may also include at least one wildcard attribute. In some cases, the compressed first expression further includes one or more of: a compression size indicator, a compression algorithm indicator, and an end-of-expression indicator. The compressed first expression may also include attributes compressed with at least two compression algorithms.

At block 610, the method may include receiving a compressed second expression that includes one or more compressed advertised attributes. The operations of block 610 may be performed by the receiver module 210 of FIGS. 2 and 3 and/or the antennas 405 and receiver module 415 of FIG. 4.

In some embodiments, the compressed second expression corresponds to a reverse DNS style name string for an advertised service. Additionally or alternatively, each of the compressed advertised attributes correspond to individual elements of one or more services names. The compressed second expression may further include at least one wildcard attribute. In some cases, the compressed second expression also includes one or more of: a compression size indicator, a compression algorithm indicator, and an end-of-expression indicator. And the compressed second expression may include attributes compressed with at least two compression algorithms.

At block 615, the method may involve comparing the compressed desired attributes and the compressed advertised attributes. The operations of block 615 may be performed by the controller module 220 of FIGS. 2 and/or 3, the comparison module 310 of FIGS. 3 and/or 4, and/or the determination module 330 of FIG. 3.

At block 620, the method may include determining if at least one of the compressed desired attributes is at least a partial match with at least one of the compressed advertised attributes. The operations of block 620 are, in various embodiments, performed by the controller module 220 of FIGS. 2 and/or 3, the comparison module 310 of FIGS. 3 and/or 4, and/or the determination module 330 of FIG. 3.

Figure 7:
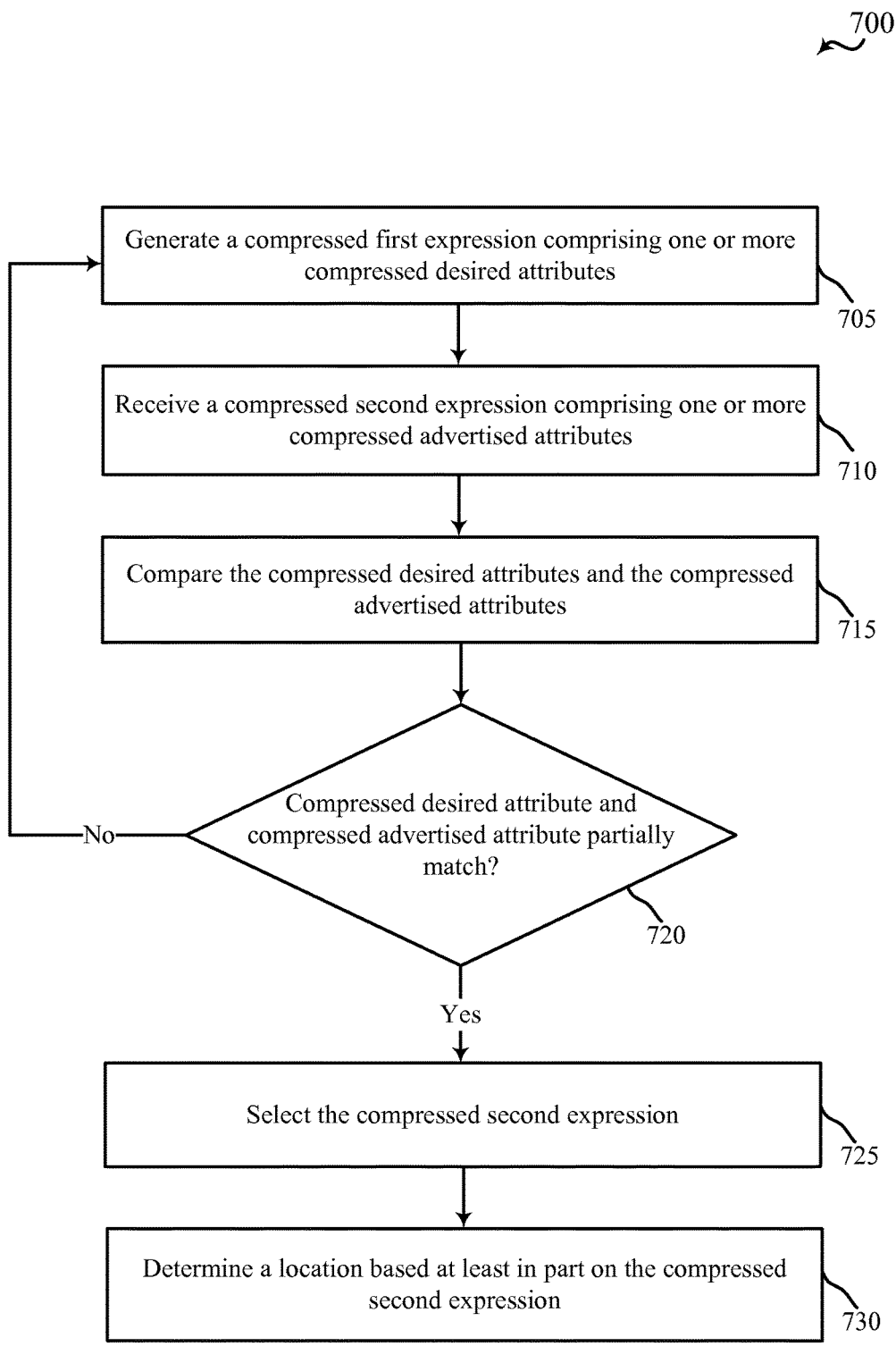
FIG. 7 depicts a flow diagram of a method of wireless communication, in accordance with various embodiments.

Next, FIG. 7 depicts a flow diagram of a method 700 of wireless communication, in accordance with various embodiments. The method 700 may be an example of the method 600, and it may be implemented by one or more of the devices 115 of FIGS. 1A, 1B, 2, 3, 4, and/or 5.

At block 705, the method may include generating a compressed first expression that includes one or more compressed desired attributes. The operations of block 705 are, in various embodiments, performed by the controller module 220 of FIGS. 2 and/or 3, the expression module 305 of FIGS. 3 and/or 4, and the generation module 325 of FIG. 3.

At block 710, the method may include receiving a compressed second expression that includes one or more compressed advertised attributes. The operations of block 710 may be performed by the receiver module 210 of FIGS. 2 and/or 3, and/or the antennas 405 and receiver module 415 of FIG. 4.

At block 715, the method may involve comparing the compressed desired attributes and the compressed advertised attributes. The operations of block 715 may be performed by the controller module 220 of FIGS. 2 and/or 3, the comparison module 310 of FIGS. 3 and/or 4, and/or the determination module 330 of FIG. 3.

At block 720, if the compressed desired attributes are not a partial match with the compressed advertised attributes, the method may include repeating one or more of the preceding steps. But if the compressed desired attributes and the compressed advertised attributes constitute at least a partial match, the method may include the operations of blocks 725 and 730.

At block 725, the method may include selecting the compressed second expression. The operations of block 725 may be performed by the controller module 220 of FIGS. 2 and/or 3, the comparison module 310 of FIGS. 3 and/or 4, and/or the selection module 335 of FIG. 3.

At block 730, the method may further involve determining a location based at least in part on the compressed second expression. The operations of block 730 are, in various embodiments, performed by the controller module 220 of FIGS. 2 and/or 3, the comparison module 310 of FIGS. 3 and/or 4, and/or the location module 340 of FIG. 3. In some embodiments, determining a location includes determining a location of a service advertised by the compressed second expression.

Figure 8:
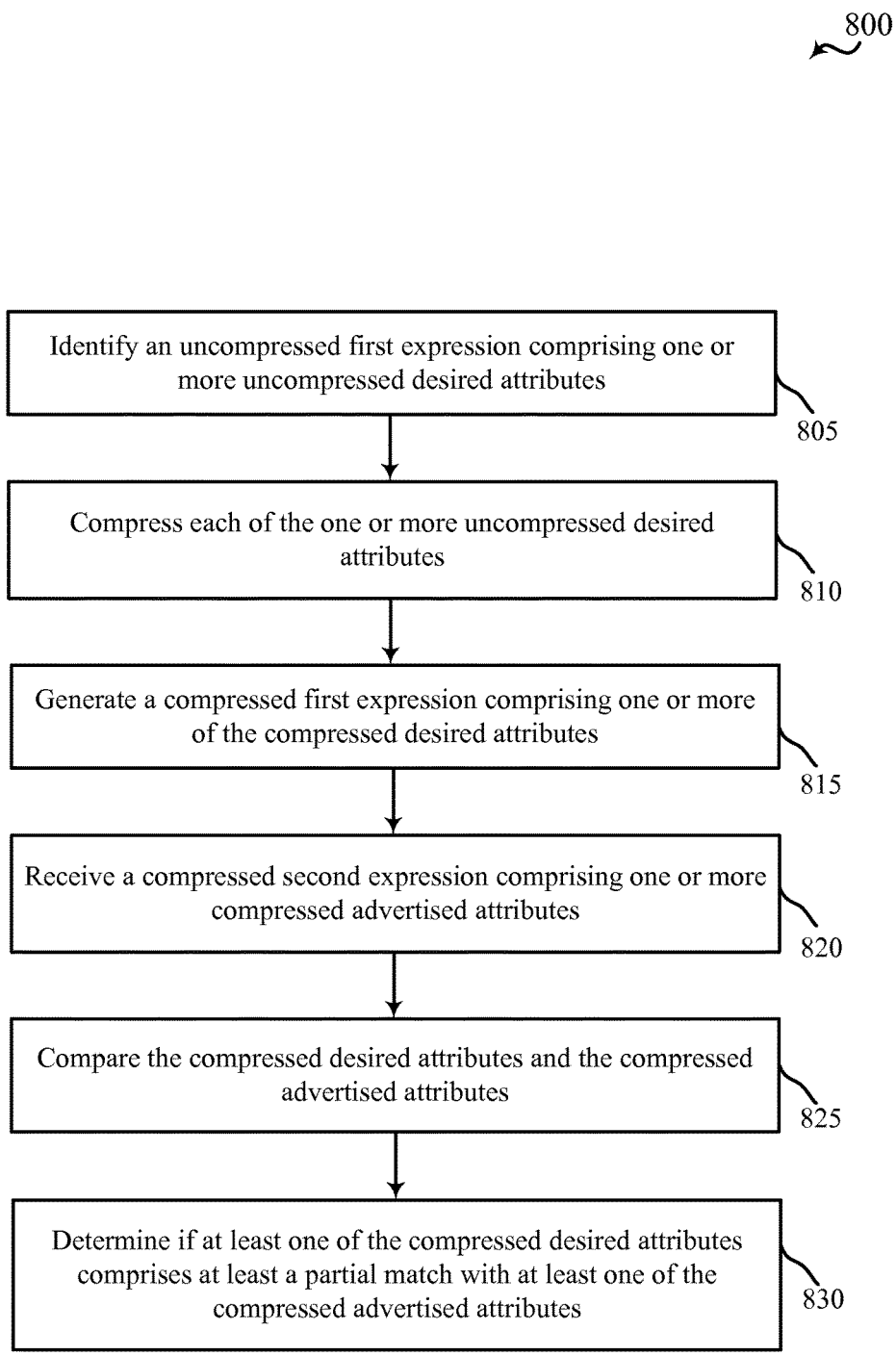
FIG. 8 depicts a flow diagram of a method of wireless communication, in accordance with various embodiments.

Next, FIG. 8 depicts a flow diagram of a method 800 of wireless communication, in accordance with various embodiments. The method 800 may be an example of the methods 600 and/or 700, and it may be implemented by one or more of the devices 115 of FIGS. 1A, 1B, 2, 3, 4, and/or 5.

At block 805, the method may involve identifying an uncompressed first expression composed of one or more uncompressed desired attributes. The operations of block 805 are, in various examples, performed by the controller module 220 of FIGS. 2 and/or 3, the expression module 305 of FIGS. 3 and/or 4, and/or the identification module 315 of FIG. 3.

At block 810, the method may include compressing each of the one or more uncompressed desired attributes. The operations of block 810 may be performed by the controller module 220 of FIGS. 2 and/or 3, the expression module 305 of FIGS. 3 and/or 4, and/or the attribute compression module 320 of FIG. 3.

At block 815, the method may include generating a compressed first expression that includes one or more of the compressed desired attributes. The operations of block 815 are, in various embodiments, performed by the controller module 220 of FIGS. 2 and/or 3, the expression module 305 of FIGS. 3 and/or 4, and/or the generation module 325 of FIG. 3.

At block 820, the method may include receiving a compressed second expression that includes one or more compressed advertised attributes. The operations of block 820 may be performed by the receiver module 210 of FIGS. 2 and/or 3, and/or the antennas 405 and receiver module 415 of FIG. 4.

At block 825, the method may involve comparing the compressed desired attributes and the compressed advertised attributes. The operations of block 825 may be performed by the controller module 220 of FIGS. 2 and/or 3, the comparison module 310 of FIGS. 3 and/or 4, and/or the determination module 330 of FIG. 3.

At block 830, the method may include determining if at least one of the compressed desired attributes is at least a partial match with at least one of the compressed advertised attributes. The operations of block 830 are, in various embodiments, performed by the controller module 220 of FIGS. 2 and/or 3, the comparison module 310 of FIGS. 3 and/or 4, and the determination module 330 of FIG. 3.

Figure 9:
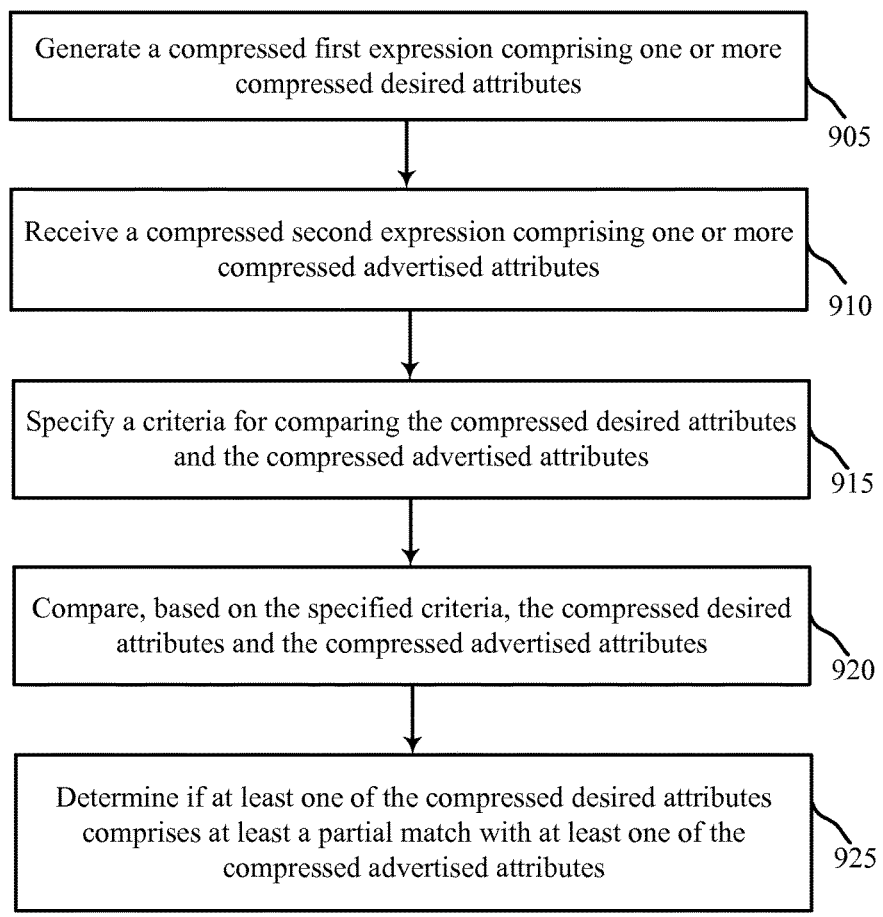
FIG. 9 depicts a flow diagram of a method of wireless communication, in accordance with various embodiments.

FIG. 9 depicts a flow diagram of a method 900 of wireless communication, in accordance with various embodiments. The method 900 may be an example of the methods 600, 700, and/or 800, and it may be implemented by one or more of the devices 115 of FIGS. 1A, 1B, 2, 3, 4, and/or 5.

At block 905, the method may include generating a compressed first expression that includes one or more compressed desired attributes. The operations of block 905 are, in various embodiments, performed by the controller module 220 of FIGS. 2 and/or 3, the expression module 305 of FIGS. 3 and/or 4, and/or the generation module 325 of FIG. 3.

At block 910, the method may include receiving a compressed second expression that includes one or more compressed advertised attributes. The operations of block 910 may be performed by the receiver module 210 of FIGS. 2 and/or 3, and/or the antennas 405 and receiver module 415 of FIG. 4.

At block 915, the method may also involve specifying a criteria for comparing the compressed desired attributes and the compressed advertised attributes. The operations of block 915 may be performed by the controller module 220 of FIGS. 2 and/or 3, the comparison module 310 of FIGS. 3 and/or 4, and/or the determination module 330 of FIG. 3.

At block 920, the method may involve comparing, based on the specified criteria, the compressed desired attributes and the compressed advertised attributes. The operations of block 920 may be performed by the controller module 220 of FIGS. 2 and/or 3, the comparison module 310 of FIGS. 3 and/or 4, and/or the determination module 330 of FIG. 3.

At block 925, the method may include determining if at least one of the compressed desired attributes is at least a partial match with at least one of the compressed advertised attributes. The operations of block 925 are, in various embodiments, performed by the controller module 220 of FIGS. 2 and/or 3, the comparison module 310 of FIGS. 3 and/or 4, and the determination module 330 of FIG. 3.

Those skilled in the art will recognize that the methods 600, 700, 800, and 900 are example implementations of the tools and techniques described herein. The methods may be performed with more or fewer steps; and they may be performed in an order other than indicated.

Techniques described above may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2).

The techniques described herein may be used for the systems and radio technologies mentioned above as well as other systems and radio technologies. For example, the techniques may be implemented in a wireless local area network (WLAN) or Wi-Fi network, which may refer to a network that is based on the protocols described in the various IEEE 802.11 standards (e.g., IEEE 802.11a/g, 802.11n, 802.11ac, 802.11 ad, 802.11ah, etc.). Additionally or alternatively, the techniques may be employed in a wireless personal area network (WPAN), such as a Bluetooth network, a network employing the IEEE 802.15 family of standards (ZigBee), and the like. In some embodiments, Wi-Fi Direct (e.g., WFDS ASP), Universal Plug and Play (UPnP), and/or IEEE 802.11ad (WiGig) protocols may be employed. In much of the description above, however, LTE terminology is used, although the techniques are applicable beyond LTE applications.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
    identifying, by a device, an uncompressed first expression comprising one or more uncompressed desired attributes associated with a service;
    compressing, by the device, each of the one or more uncompressed desired attributes;
    generating, by the device, a compressed first expression comprising one or more compressed desired attributes;
    receiving, by the device, a compressed second expression comprising one or more compressed advertised attributes;
    comparing, by the device, at least one of the compressed desired attributes and at least one of the compressed advertised attributes based at least in part on a user-specified criteria requesting a partial match comparison; and
    determining, by the device, if at least one of the compressed desired attributes comprises at least a partial match with at least one of the compressed advertised attributes.

2. The method of claim 1, further comprising:
    selecting the compressed second expression when one of the compressed desired attributes comprises at least a partial match with at least one of the compressed advertised attributes.

3. The method of claim 2, further comprising:
    determining a location based at least in part on the compressed second expression.

4. The method of claim 3, wherein determining the location comprises determining a location of a service advertised by the compressed second expression.

5. The method of claim 1, further comprising:
    compressing each of the one or more uncompressed desired attributes separately.

6. The method of claim 1, wherein the compressed first expression corresponds to a reverse domain name system (DNS) style name string for a desired service and the compressed second expression corresponds to a reverse DNS style name string for an advertised service.

7. The method of claim 1, wherein each of the compressed desired attributes and each of the compressed advertised attributes correspond to individual elements of one or more services names, the one or more service names comprising reverse domain name system (DNS) style name strings.

8. The method of claim 1, further comprising:
    automatically specifying a criteria for comparing the compressed desired attributes and the compressed advertised attributes.

9. The method of claim 1, wherein at least one of the compressed first expression or the compressed second expression further comprises:
    at least one wildcard attribute.

10. The method of claim 1, wherein at least one of the compressed first expression or the compressed second expression further comprises:
    a compression size indicator identifying a number of bits associated with the one or more uncompressed desired attributes of the at least one of the compressed first expression, or the compressed second expression, or both.

11. The method of claim 1, wherein at least one of the compressed first expression or the compressed second expression further comprises:
    a compression algorithm indicator indicating a type of algorithm used in compressing the one or more uncompressed desired attributes.

12. The method of claim 1, wherein at least one of the compressed first expression or the compressed second expression further comprises:
    an end-of-expression indicator.

13. The method of claim 1, wherein at least one of the compressed first expression or the compressed second expression further comprises:
    attributes compressed with at least two compression algorithms.

14. A system for wireless communication, comprising:
means for identifying, by a device, an uncompressed first expression comprising one or more uncompressed desired attributes associated with a service;
means for compressing, by the device, each uncompressed desired attribute;
means for generating, by the device, a compressed first expression comprising one or more compressed desired attributes;
means for receiving, by the device, a compressed second expression comprising one or more compressed advertised attributes;
means for comparing, by the device, at least one of the compressed desired attributes and at least one of the compressed advertised attributes based at least in part on a user-specified criteria requesting a partial match comparison; and
means for determining, by the device, if at least one of the compressed desired attributes comprises at least a partial match with at least one of the compressed advertised attributes.

15. The system of claim 14, further comprising:
means for selecting the compressed second expression when one of the compressed desired attributes comprises at least a partial match with at least one of the compressed advertised attributes.

16. The system of claim 15, further comprising:
means for determining a location based at least in part on the compressed second expression.

17. The system of claim 14, further comprising:
means for compressing each of the one or more uncompressed desired attributes separately.

18. The system of claim 14, wherein the compressed first expression corresponds to a reverse domain name system (DNS) style name string for a desired service and the compressed second expression corresponds to a reverse DNS style name string for an advertised service.

19. The system of claim 14, wherein each of the compressed desired attributes and each of the compressed advertised attributes correspond to individual elements of one or more services names, the one or more service names comprising reverse domain name system (DNS) style name strings.

20. The system of claim 14, further comprising:
means for automatically specifying a criteria for comparing the compressed desired attributes and the compressed advertised attributes.

21. An apparatus for wireless communication, comprising:
a processor;
a memory in electronic communication with the processor; and
instructions stored in the memory, the instructions being executable by the processor to:
identify an uncompressed first expression comprising one or more uncompressed desired attributes associated with a service;
compress each uncompressed desired attribute;
generate a compressed first expression comprising one or more compressed desired attributes;
receive a compressed second expression comprising one or more compressed advertised attributes;
compare at least one of the compressed desired attributes and at least one of the compressed advertised attributes based at least in part on a user-specified criteria requesting a partial match comparison; and
determine if at least one of the compressed desired attributes comprises at least a partial match with at least one of the compressed advertised attributes.

22. The apparatus of claim 21, wherein the instructions are executable by the processor to:
select the compressed second expression when one of the compressed desired attributes comprises at least a partial match with at least one of the compressed advertised attributes.

23. The apparatus of claim 22, wherein the instructions are executable by the processor to:
determine a location based at least in part on the compressed second expression.

24. The apparatus of claim 21, wherein the instructions are executable by the processor to:
compress each of the one or more uncompressed desired attributes separately.

25. The apparatus of claim 21, wherein the instructions are executable by the processor to:
automatically specify a criteria for comparing the compressed desired attributes and the compressed advertised attributes.

26. A computer program product for wireless communication, the computer program product comprising a non-transitory computer readable medium, the computer readable medium storing instructions thereon, the instructions being executable by a processor to:
identify an uncompressed first expression comprising one or more uncompressed desired attributes associated with a service;
compress each uncompressed desired attribute;
generate a compressed first expression comprising one or more compressed desired attributes;
receive a compressed second expression comprising one or more compressed advertised attributes;
compare at least one of compressed desired attributes at least one of the compressed advertised attributes based at least in part on a user-specified criteria requesting a partial match comparison; and
determine if at least one of the compressed desired attributes comprises at least a partial match with at least one of the compressed advertised attributes.

27. The computer program product of claim 26, wherein the instructions are executable by the processor to:
select the compressed second expression when one of the compressed desired attributes comprises at least a partial match with at least one of the compressed advertised attributes.

28. The computer program product of claim 27, wherein the instructions are executable by the processor to:
determine a location based at least in part on the compressed second expression.

29. The computer program product of claim 26, wherein the instructions are executable by the processor to:
compress each of the one or more uncompressed desired attributes separately.

30. The computer program product of claim 26, wherein the instructions are executable by the processor to:
automatically specify a criteria for comparing the compressed desired attributes and the compressed advertised attributes.

* * * * *